United States Patent [19]

Boaz

[11] Patent Number: 4,857,096

[45] Date of Patent: * Aug. 15, 1989

[54] METHOD OF FORMING A GLASS SHEET WITH A UV-BASE CERAMIC PAINT THEREON

[75] Inventor: Premakaran T. Boaz, Livonia, Mich.

[73] Assignee: Ford Motor Company, Dearborn, Mich.

[*] Notice: The portion of the term of this patent subsequent to Aug. 4, 2004 has been disclaimed.

[21] Appl. No.: 122,964

[22] Filed: Nov. 19, 1987

[51] Int. Cl.$^4$ .................. C03B 23/023; C03C 8/04
[52] U.S. Cl. ................... 65/60.51; 65/60.1; 65/24; 65/60.52; 65/106; 501/19
[58] Field of Search .............. 501/19; 65/60.1, 60.5, 65/60.52, 106, 60.51, 24

[56] References Cited

U.S. PATENT DOCUMENTS

| | | | |
|---|---|---|---|
| 3,356,515 | 12/1967 | McGlothlin | 501/19 X |
| 4,596,590 | 6/1986 | Boaz | 65/60.51 |
| 4,684,388 | 8/1987 | Boaz | 65/24 |

*Primary Examiner*—Arthur Kellogg
*Attorney, Agent, or Firm*—William E. Johnson; Clifford L. Sadler; Peter D. McDermott

[57] ABSTRACT

This specification is directed to a UV-base ceramic paint composition and a method of forming a glass sheet with a UV-base ceramic paint thereon. The method has the following steps. A UV-base ceramic paint is applied to the glass sheet. The UV-base ceramic paint includes selected ceramic paint components along with, as a new component thereof, finely divided zinc metal powder. The glass sheet is subjected to UV radiation and then heated to a temperature which softens the glass sheet sufficiently so that the glass sheet can be formed. The glass sheet and the ceramic paint thereon are engaged with a fiberglass covered forming die to form the heated glass sheet to a desired shape. The forming die is removed from engagement with the glass sheet. The finely divided zinc metal powder addition to the ceramic paint is credited with being effective to prevent sticking of any of the ceramic paint to the forming die. The glass sheet is cooled to obtain a formed glass sheet with a ceramic paint thereon.

8 Claims, No Drawings

METHOD OF FORMING A GLASS SHEET WITH A UV-BASE CERAMIC PAINT THEREON

BACKGROUND OF THE INVENTION

1. Field of the Invention

This application is directed to a UV-base ceramic paint composition and a method of forming a glass sheet with a UV-base ceramic paint thereon. The UV-base ceramic paint composition is one which does not stick to fiberglass materials at elevated temperatures when the fiberglass is brought into contact therewith. The method of forming the glass sheet is one which allows a UV-base ceramic painted glass sheet to be contacted by a fiberglass covered forming die which forms the glass in a heated condition into a desired shape. The forming operation may be carried out without any sticking of the UV-base ceramic paint to the fiberglass forming die.

2. Description of Related Art

Ceramic paint compositions are generally well known to the skilled artisan. These ceramic paint compositions can be used, for example, to form borders around the edges of glass sheets which are used as windshields, side lites and back lites in motor vehicles.

Such ceramic paints usually include a mixture of metal oxides, which together act as a coloring agent for the ceramic paint. The metal oxides are nonreactive with one another and nonreactive with any elements or compounds they normally come in contact with while being heated to temperatures up to about 1300° F. The mixture of metal oxides can be controlled so as to get a selected color from the ceramic paint composition. Normally, in automotive applications, the selected color is black, although shades of gray are now becoming popular.

Such ceramic paint compositions also include a low melting point glass frit which generally melts at a temperature below 1300° F. The low melting point glass frit is the material which bonds the mixture of metal oxides to the glass sheet and ensures that it remains after the glass sheet has been cooled back to room temperature. A vehicle is normally mixed with the metal oxides and low melting point glass to allow the ceramic paint composition to be applied in a paint application process. For example, if the paint application process is a silk screen printing operation, the vehicle can be a UV-base organic medium for carrying the other materials during the silk screen printing operation.

Many different types of ceramic paint compositions of the above general type are well known to skilled artisans. The exact metal oxides, low melting point glass frit, and UV-base vehicle selected for such paint are well within the skill of artisans in this area. The manner in which the different materials may be varied in order to achieve the results desired in a particular application is also well within the skill of an artisan.

As was discussed in my recently issued patent, U.S. Pat. No. 4,596,590, I found, in the situation where a sheet having a ceramic paint thereon was contacted by a fiberglass forming die, that paints of the above-described general composition had a great tendency to stick on the fiberglass covered die. The sheet of glass, of course, was being heated to an elevated temperature, generally less than 1300° F., so that it may be engaged by a forming die and formed into a configuration other than flat.

As further discussed in my patent '590, the difficulty arose that the ceramic paint compositions generally known to skilled artisans would not operate in a glass forming process in which a heated glass sheet containing the ceramic paint composition was engaged by a fiberglass covered forming die. As I disclosed in my patent, no other materials are known for covering the forming die because the fiberglass is the only material which will withstand the heat and rigorous requirements of the environment to which it is subjected. Other materials that have been used to cover forming dies quickly break down and wear out when repeatedly brought into engagement with the surface of a heated glass sheet. Thus, fiberglass is the material which is used to cover forming dies and this material, unfortunately, sticks to ceramic paint compositions then known to skilled artisans when those compositions are heated to an elevated temperature which is necessary to form glass by a forming die.

In my patent '590, I disclosed a method of forming glass sheets with a ceramic paint thereon which could withstand the high temperatures and repeated engagements of painted glass sheets by the same forming die without paint sticking to the forming die. I solved the problem by adding to the ceramic paint, as a new component thereof, a metal oxide having a low valence oxidation state and a high valence oxidation state. The metal oxide is in its low valence state when applied to the ceramic paint. My patent taught that I believed, when this metal oxide powder is subjected to a heating operation, that a portion of the powder on the upper surface of the ceramic paint composition readily oxidizes to form an excellent, fully oxidized metal oxide barrier across the top surface of the paint which insulates the low melting point glass frit and isolates the same from the fiberglass cloth. In particular, I taught that stannous oxide was an excellent metallic oxide powder to use.

In carrying on additional work in this area, particularly in working with UV-base ceramic paints, I found that the utilization of stannous oxide did have some drawbacks. In a UV-base system, when stannous oxide is present in the paint in an amount greater than 20% by weight or so, there is some tendency for the paint to stick on the fiberglass cloth when a large amount of pressure is applied to the painted glass sheet in a bending operation.

In a subsequently issued patent of mine, namely, U.S. Pat. No. 4,684,388, issued Aug. 4, 1987, I disclosed a method of forming a glass sheet with a UV-base ceramic paint thereon. In the method disclosed in my '388 patent, the following steps were carried out. A UV-base ceramic paint is applied to a glass sheet. The UV-base ceramic paint includes normal ceramic paint components along with, as a new component thereof, finely divided zinc metal powder and finely divided stannous oxide powder. The glass sheet is subjected to UV radiation and then heated to a temperature which softens the glass sheet sufficiently so that the glass sheet can be formed. The glass sheet and the ceramic paint thereon are engaged with a fiberglass covered forming die to form the heated glass sheet to a desired shape. The forming die is removed from engagement with the glass sheet. The finely divided zinc metal powder and finely divided stannous oxide powder addition to the ceramic paint is credited with being effective to prevent sticking of any ceramic paint to the forming die. The glass sheet is cooled to obtain a formed glass sheet with a ceramic paint thereon.

It is an object of this invention to provide a nonstick ceramic paint containing only one additive to achieve the nonstickability of that paint.

It is a feature of this invention to have a nonstick ceramic paint to which only a single material has been added to achieve the nonstickability thereof.

It is an advantage of this invention that only a single addition is made to a ceramic paint in order to achieve nonstick characteristics therefor.

It is an object of this invention to provide a method of forming a glass sheet having a UV-base ceramic paint thereon in such a manner that the paint does not stick to a forming die.

It is a feature of this invention that a method is provided for forming a glass sheet having a UV-base ceramic paint thereon in such a manner that the paint does not stick to a forming die.

It is an advantage of this invention that a method is provided for forming a glass sheet having a UV-base ceramic paint thereon in such a manner that the paint does not stick to a forming die.

DISCLOSURE OF THE INVENTION

This invention is directed to a UV-base ceramic paint composition and a method of forming a glass sheet with a UV ceramic paint thereon. The ceramic paint composition used with the method of my invention comprises the following materials. A mixture of metal oxides is provided which together act as a coloring agent for the ceramic paint. The mixture of metal oxides are nonreactive with one another and nonreactive with any elements or compounds they normally come in contact with while being heated to a temperature in a range up to 1300° F. A low melting point glass frit is also part of the ceramic paint composition. This low melting point glass frit is a glass material which melts below 1300° F. to act as a binding material to bind the metal oxides to a glass surface.

My ceramic paint composition also includes, as an element thereof, finely divided zinc metal powder. This finely divided zinc metal powder is mixed with the aforementioned materials and a UV-base organic vehicle in order to form a liquid paint which can be silk screen printed.

My invention is also directed to a method of forming a glass sheet with a UV-base ceramic paint thereon. In accordance with the teachings of the method of my invention, the following steps are carried out. A ceramic paint is applied to a glass sheet. The ceramic paint includes finely divided zinc metal powder as a constituent thereof. The remainder of the ceramic paint may be made up from metal oxides, fully oxidized, which together act as a coloring agent for the ceramic paint. These metal oxides are nonreactive with one another and nonreactive with any elements or compounds they normally come in contact with while being heated to temperatures up to 1300° F. The ceramic paint, in addition, includes a low melting point glass frit and the UV-base vehicle needed to transport the remaining materials so that they may be applied to the glass sheet.

After the application of the UV-base ceramic paint, the glass sheet is subject to UV radiation to set up the ceramic paint. The glass sheet is then heated to a temperature which softens the glass sheet sufficiently so that the glass sheet can be formed. The heating also drives off any volatiles remaining in the UV-base paint after the UV curing step. This heating step also firmly bonds the remaining portion of the UV-base ceramic paint to the glass sheet. The glass sheet and the ceramic paint thereon are then engaged with a fiberglass covered forming die to form the heated glass sheet to a desired shape.

After shaping, the forming die is removed from engagement with the glass sheet. Oxidation of the finely divided zinc metal during the heating of the glass sheet is effective to prevent sticking of any of the ceramic paint to the forming die.

DESCRIPTION OF THE PREFERRED EMBODIMENT

The novel features that are considered characteristic of my UV-base ceramic paint composition and my method of forming a glass sheet with a UV-base ceramic paint thereon are set forth with particularity in the appended claims. The invention itself, however, both as to its organization and its method of operation, together with additional objects, advantages and features thereof, will best be understood from the following description of specific embodiments.

The following description is what I now consider to be a preferred embodiment of my UV-base ceramic paint composition and of the method of forming a glass sheet with a UV-base ceramic paint thereon as per my invention. The following description also sets forth what I now contemplate to be the best mode of making the ceramic paint composition and of forming a glass sheet with a ceramic paint thereon. The description is not intended to be a limitation upon the broader principles of this invention.

The ceramic paint composition of my invention comprises the following materials. The first material is a mixture of metal oxides which together act as a coloring agent for the UV-base ceramic paint. These metal oxides, because of their manufacturing process, are normally all in their highest oxidation state. A small proportion of the metal oxides may be in a lower valence state simply because of manufacturing variability. However, normally the mixture of metal oxides used as a coloring agent is in its highest oxidation state because of the manufacturing process, and thus the mixture of metal oxides is nonreactive with one another and nonreactive with any elements or compounds they normally come in contact with while being heated to a temperature in a range up to 1300° F. in an oxygen containing atmosphere.

The nonreactive oxides generally include oxides of material such as chrome, cobalt, nickel, manganese, iron and copper. Such a mixture is commonly known as black oxide powder and is well known in the industry. Any oxide included in this material is normally in its highest valence oxidation state because of the process of manufacture and because those who are purchasing the black oxide powder mixture desire a material which does not react when heated to moderate temperatures. Other mixtures of oxides may be put together in order to get different colors, as is well known in the industry. In normal practice, the mixture of nonreactive metal oxides makes up about 8–25% by weight of the ceramic paint composition, preferably 10–20% by weight, and most preferably 16% by weight.

A second material forming the ceramic paint composition is a low melting point glass frit. Normally, the low melting point glass frit is a lead borosilicate glass frit high in lead content. Any other low melting point glass frit is also suitable, but the lead borosilicate glass is preferred because it is readily available and relatively inexpensive. This material is included in a range of 10–50% by weight, preferably 30 to 35% by weight.

In accordance with the teachings of the method of my invention, a finely divided zinc metal powder is also included. In accordance with the teachings of the preferred embodiment, the zinc metal powder is used up to 60% by weight in the composition. As more and more zinc powder is used, the UV-base ceramic paint becomes more gray in color from a black color. If a black color is desired, zinc powder should not exceed 40%. If a gray color is desired, the higher amounts of zinc powder, up to 60%, may be used.

In accordance with a preferred embodiment of the invention, the zinc metal powder should be in fine dust form with a particle size small enough to pass through 325 mesh screen. Before mixing the zinc metal powder with the other ingredients, the moisture content of the powder should be less than 0.1% by weight and the powder should not be agglomerated. Chemically, the zinc metal powder should be at least 95% by weight of metallic zinc. The zinc oxide content should not exceed 5% by weight and all other stray elements should not exceed a total of 0.1% by weight.

A UV-base vehicle is mixed with the metal oxides, the low melting point glass frit, and the finely divided zinc metal powder to form all of the mentioned materials into a UV ceramic paint which can be applied by a silk screen printing operation to a glass surface. UV bases for making a UV-base paint are well known to the skilled artisan. A particularly good material is sold by Drakenfeld Incorporated as 1718 UV-Base (trademark; UV-base vehicle for ceramic paint). This UV medium would normally make up 15–25% by weight of a paint composition, preferably 15 to 20% by weight.

The zinc metal powder is the thing that makes the ceramic paint composition nonstickable. I believe that when this powder is subjected to a heating operation, the portion of the powder on the upper surface of the ceramic paint composition readily oxidizes to form an excellent, fully oxidized metal oxide barrier across the top surface of the paint, which insulates the low melting point glass frit and isolates the same from the fiberglass cloth. Thus, the fiberglass cloth, while contacting the surface, does not adhere to the ceramic paint and the paint does not stick to the cloth. I believe this is the mechanism by which the nonstick characteristics of my paint composition are achieved, but I do not wish to be bound by this theory. I know, in fact, that if you follow what I have said, the paint will not stick.

In accordance with the teachings of my invention, a method of forming a glass sheet with a UV-base ceramic paint thereon is set forth below. The method has the following steps. A UV-base ceramic paint is applied to the glass sheet. The ceramic paint includes a mixture of metal oxides which together act as a coloring agent for the ceramic paint. The metal oxides are oxides which are nonreactive with one another and nonreactive with any elements or compounds they normally come into contact with while being heated to temperatures up to 1300° F. A low melting point glass frit is also included in the ceramic paint compositions. A principal ingredient from a functional standpoint in achieving nonstick capabilities for the UV-base ceramic paint is finely divided zinc metal powder. A UV-base vehicle is also mixed with the metal oxides, the low melting point glass frit, and the finely divided zinc metal powder to form all of the mentioned materials into a UV-base ceramic paint which can be applied to a glass surface.

After the ceramic paint has been applied to the glass sheet, the glass sheet is subjected to UV radiation to set up the ceramic paint so that it is bonded to the glass sheet. The glass sheet is then heated to a temperature which softens the glass sufficiently so that the glass sheet can be formed. Generally, this temperature is in a range of about 1175–1250° F., which is below 1300° F. After heating, the glass sheet and the ceramic paint thereon are engaged with a fiberglass covered forming die to form the heated glass sheet into a desired shape. The heating operation, of course, burns off all remaining organic material contained in the UV-base paint and binds the remaining portion of the UV-base ceramic paint to the glass sheet. The zinc metal powder addition to the ceramic paint is effective to prevent sticking of any of the ceramic paint to the forming die.

After the forming die has been removed from engagement with the glass sheet and the ceramic paint, without any sticking of the ceramic paint thereto, the glass sheet may be cooled to obtain a formed glass sheet with ceramic paint thereon. Normally, the glass sheet is rapidly cooled in a glass tempering operation to achieve a tempered glass product having the ceramic paint thereon.

While particular embodiments of the invention have been illustrated and described, it will be obvious to those skilled in the art that various changes and modifications may be made without departing from my invention, and it is intended to cover in the appended claims all such modifications and equivalents as fall within the true spirit and scope of this invention.

I claim:

1. A method of forming a glass sheet with a ceramic paint thereon, which method comprises the steps of:
   applying a UV-base ceramic paint to the said glass sheet, said UV-base base ceramic paint including finely divided zinc metal powder as a constituent thereof;
   subjecting said glass sheet with said UV-base ceramic paint thereon to UV radiation to cure said paint;
   heating said glass sheet to a temperature which softens said glass sheet sufficiently so that said glass sheet can be formed, said heating burning off any remaining organic material contained in said UV-base ceramic paint and binding said remaining portion of said UV-base ceramic paint to said glass sheet;
   engaging said glass sheet and said UV-base ceramic paint thereon with a fiberglass covered forming die to form said heated glass sheet to a desired shape; and
   removing said forming die from engagement with said glass sheet, said zinc metal addition to said UV-base ceramic paint being effective to prevent sticking of any of said UV-base ceramic paint to said forming die.

2. The method of claim 1, wherein said UV-base ceramic paint contains:
   a mixture of metal oxides which are nonreactive with one another and nonreactive with any elements or compounds they come in contact with while being heated to a temperature in a range up to 1300° F. forming 8 to 25% by weight of said composition;
   a low melting point glass frit forming 10 to 50% by weight of said composition;
   a UV-base vehicle forming 15 to 25% by weight of said composition; and
   finely divided zinc metal powder forming up to 60% by weight of said composition.

3. The method of claim 2, wherein said finely divided zinc metal powder of said UV-base paint is at least 95% by weight metallic zinc and said finely divided zinc metal powder passes through a 325 mesh screen.

4. A method of forming a glass sheet with a ceramic paint thereon, which method comprises the steps of:
applying a UV-base ceramic paint to the said glass sheet, said UV-base base ceramic paint including finely divided zinc metal powder as a constituent thereof;
subjecting said glass sheet with said UV-base ceramic paint thereon to UV radiation to cure said paint;
heating said glass sheet to a temperature which softens said glass sheet sufficiently so that said glass sheet can be formed, said heating burning off any remaining organic material contained in said UV-base ceramic paint and binding said remaining portion of said UV-base ceramic paint to said glass sheet;
engaging said glass sheet and said UV-base ceramic paint thereon with a fiberglass covered forming die to form said heated glass sheet to a desired shape;
removing said forming die from engagement with said glass sheet, said zinc metal addition to said UV-base ceramic paint being effective to prevent sticking of any of said UV-base ceramic paint to said forming die; and
cooling said glass sheet to obtain a formed glass sheet with a ceramic paint thereon.

5. The method of claim 4, wherein said UV-base ceramic paint contains:
a mixture of metal oxides which are nonreactive with one another and nonreactive with any elements or compounds they come in contact with while being heated to a temperature in a range up to 1300° F. forming 8 to 25% by weight of said composition;
a low melting point glass frit forming 10 to 50% by weight of said composition;
a UV-base vehicle forming 15 to 25% by weight of said composition; and
finely divided zinc metal powder forming up to 60% by weight of said composition.

6. The method of claim 5, wherein said finely divided zinc metal powder of said UV-base paint is at least 95% by weight metallic zinc and said finely divided zinc metal powder passes through a 325 mesh screen.

7. The method of claim 4, wherein said UV-base ceramic paint contains:
a mixture of metal oxides which are nonreactive with one another and nonreactive with any elements or compounds they come in contact with while being heated to a temperature in a range up to 1300° F. forming 20 to 25% by weight of said composition;
a low melting point glass frit forming 30 to 35% by weight of said composition;
a UV-base vehicle forming 15 to 20% by weight of said composition; and
finely divided zinc metal powder forming up to 30% by weight of said composition.

8. The method of claim 7, wherein said finely divided zinc metal power of said UV-base paint is at least 95% by weight metallic zinc and said finely divided zinc metal powder passes through a 325 mesh screen.

* * * * *